(12) United States Patent
Austin et al.

(10) Patent No.: US 11,462,113 B2
(45) Date of Patent: Oct. 4, 2022

(54) VEHICLE AUTOMATION-CONNECTED PEDESTRIAN RISK ASSESSMENT DEVICE

(71) Applicant: TOYOTA MOTOR ENGINEERING & MANUFACTURING NORTH AMERICA, INC., Plano, TX (US)

(72) Inventors: Benjamin P. Austin, Saline, MI (US); Joshua E. Domeyer, Madison, WI (US); John K. Lenneman, Okemos, MI (US); Philip Babian, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 54 days.

(21) Appl. No.: 17/081,169

(22) Filed: Oct. 27, 2020

(65) Prior Publication Data

US 2022/0130254 A1  Apr. 28, 2022

(51) Int. Cl.
| | |
|---|---|
| *G08G 1/16* | (2006.01) |
| *H04W 4/44* | (2018.01) |
| *B60Q 1/50* | (2006.01) |
| *B60Q 1/26* | (2006.01) |
| *H04W 4/46* | (2018.01) |

(52) U.S. Cl.
CPC .......... *G08G 1/166* (2013.01); *B60Q 1/2611* (2013.01); *B60Q 1/50* (2013.01); *B60Q 1/503* (2013.01); *G08G 1/161* (2013.01); *H04W 4/44* (2018.02); *H04W 4/46* (2018.02)

(58) Field of Classification Search
CPC ...... G08G 1/166; G08G 1/161; B60Q 1/2611; B60Q 1/50; B60Q 1/503; H04W 4/44; H04W 4/46
See application file for complete search history.

(56) References Cited

U.S. PATENT DOCUMENTS 9,361,409 B2    6/2016  Kozloski et al.
9,513,632 B1 *  12/2016 Gordon ............ G08G 1/096791
(Continued)

OTHER PUBLICATIONS

SAE International ; Automated Driving Levels of Driving Automation Are Defined in New SAE International Standard J3016 ; www.sae.org/autodrive ; Jan. 2014 ; 2 Pages.

*Primary Examiner* — Mohamed Barakat
(74) *Attorney, Agent, or Firm* — Oblon, McClelland, Maier & Neustadt, L.L.P.

(57) ABSTRACT

Systems and methods for alerting a pedestrian of the density of automated vehicles to non-automated vehicles in an area by broadcasting a visual signal representing a group mode status of automated vehicles travelling towards or within a roadway intersection. The group mode status may be broadcast as a percentage of automated vehicles to total vehicles or can be broadcast as a ratio of automated vehicles to non-automated vehicles on an external mode indicator of a subject automated vehicle. The visual signal may be broadcast as a pattern of lighting, a change in light intensity, a change in colors or a change in text. The group mode status may also be broadcast to a pedestrian equipped with a wireless device via vehicle-to-infrastructure communications. The group status may also be broadcast to and displayed on infrastructure component, such as a street light, display post, crosswalk sign, or building display configured to receive signals.

17 Claims, 12 Drawing Sheets

(56) References Cited

U.S. PATENT DOCUMENTS

| | | | |
|---|---|---|---|
| 9,694,813 B2 | 7/2017 | Toyoda | |
| 9,809,158 B2 | 11/2017 | Geller | |
| 9,855,890 B2 * | 1/2018 | James | B60K 37/06 |
| 9,868,394 B1 * | 1/2018 | Fields | G08G 1/096758 |
| 10,149,132 B2 | 12/2018 | Kim et al. | |
| 10,262,528 B2 | 4/2019 | Fields et al. | |
| 10,417,904 B2 * | 9/2019 | Madigan | H04W 4/029 |
| 10,434,935 B1 * | 10/2019 | Zhang | B60Q 1/2603 |
| 2017/0088038 A1 * | 3/2017 | Geller | B60Q 1/50 |
| 2017/0286784 A1 * | 10/2017 | Bhatia | H04B 1/38 |
| 2017/0345292 A1 | 11/2017 | Haran | |
| 2019/0164422 A1 | 5/2019 | Bai et al. | |

\* cited by examiner

VEHICLE AUTOMATION-CONNECTED PEDESTRIAN RISK ASSESSMENT DEVICE

BACKGROUND

Technical Field

The present disclosure is directed to a method for informing pedestrians of which vehicles are under automated control around the pedestrian so that the pedestrian may assess a confidence level for engaging with the vehicular traffic.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Road users (e.g., pedestrians, cyclists, etc.) travelling in an external environment which includes vehicles driven with automated systems, (including fully autonomous vehicles (AVs)) and manually driven vehicles (MVs) need to know who or what is driving the surrounding vehicles in order to make informed decisions as to their own movements within the external environment. A pedestrian or other road user may have higher confidence when engaging with automated vehicles than with manually driven vehicles due to the uncertainty that the driver of the manual vehicle may be distracted or make poor decisions regarding their movements.

An automated vehicle may provide notification on an external display as to its driving mode (automated or manual). For example, when driving in automated mode, an external mode indicator may be activated to alert road users and manually driven vehicles that it is travelling under automated control. The external mode indicator may be mounted to the roof of the vehicle. (See: U.S. Pat. Nos. 9,809,158 B2 and 9,855,890 B2, each incorporated herein by reference in its entirety).

However, a method for providing pedestrian awareness of the number of vehicles under automated control has not been previously described.

Accordingly, it is one object of the present disclosure to provide methods and systems for providing a road user with the number of vehicles which are under automated control relevant to the location of the road user.

SUMMARY

Embodiments of the present disclosure describe a system and methods for alerting a pedestrian of the density of automated vehicles to non-automated vehicles in an area by broadcasting a visual signal representing a group mode status of automated vehicles travelling towards or within a roadway intersection in the area.

In an exemplary embodiment, an automated vehicle system for broadcasting a group mode status of automated vehicles travelling towards or within a roadway intersection is described, comprising a subject automated vehicle including a vehicle-to-vehicle communications unit configured to communicate with other automated vehicles within an area surrounding the subject automated vehicle and receive a mode status from each other automated vehicle, wherein the mode status reflects whether the other automated vehicle is operating in automated mode, and or in non-automated mode, at least one external vehicle sensor configured to generate data upon detecting vehicles or pedestrians within the defined area, an external mode indicator configured to broadcast a visual signal, a computing unit operatively connected to the vehicle-to-vehicle communications unit, the at least one external vehicle sensor and the external mode indicator, the computing unit including a computer-readable medium having program instructions, executable by processing circuitry, to cause the processing circuitry to define the area by a radius which is centered on the subject automated vehicle, determine whether there are any pedestrians near the roadway intersection, when there are pedestrians near the roadway intersection, calculate the group mode status, generate a visual signal representing the group mode status, and actuate the external mode indicator to broadcast the visual signal.

In another exemplary embodiment, a method for broadcasting a visual signal representing a group mode status of automated vehicles travelling towards or within a roadway intersection, comprising defining, with processing circuitry, an area around a subject automated vehicle by a radius which is centered on the subject automated vehicle, detecting, with external sensors of the subject automated vehicle, any pedestrians and vehicles within the area, determining, with the processing circuitry, a first total number of vehicles in the area, receiving a mode status from each other automated vehicle in the area, wherein the mode status reflects whether the other automated vehicle is operating in automated mode and or in non-automated mode, determining, with the processing circuitry, whether there are any pedestrians near the roadway intersection, when there are pedestrians near the roadway intersection calculating the group mode status, generating a visual signal representing the group mode status, actuating, with computing circuitry, an external mode indicator to broadcast the visual signal, when there are no pedestrians near the roadway intersection, suppressing the broadcast of the visual signal.

In another exemplary embodiment, a non-transitory computer readable medium having instructions stored therein that, when executed by one or more processors, cause the one or more processors to perform a method for broadcasting a visual signal representing a group mode status of automated vehicles travelling towards or within a roadway intersection is described, comprising defining, with processing circuitry, an area around a subject automated vehicle by a radius which is centered on the subject automated vehicle, detecting, with external sensors of the subject automated vehicle, any pedestrians and vehicles within the area, determining, with the processing circuitry, a first total number of vehicles in the area, receiving a mode status from each other automated vehicle in the area, wherein the mode status reflects whether the other automated vehicle is operating in automated mode and or in non-automated mode, determining, with the processing circuitry, whether there are any pedestrians near the roadway intersection, when there are pedestrians near the roadway intersection calculating the group mode status, generating a visual signal representing the group mode status, actuating, with computing circuitry, an external mode indicator to broadcast the visual signal, when there are no pedestrians near the roadway intersection, suppressing the broadcast of the visual signal.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
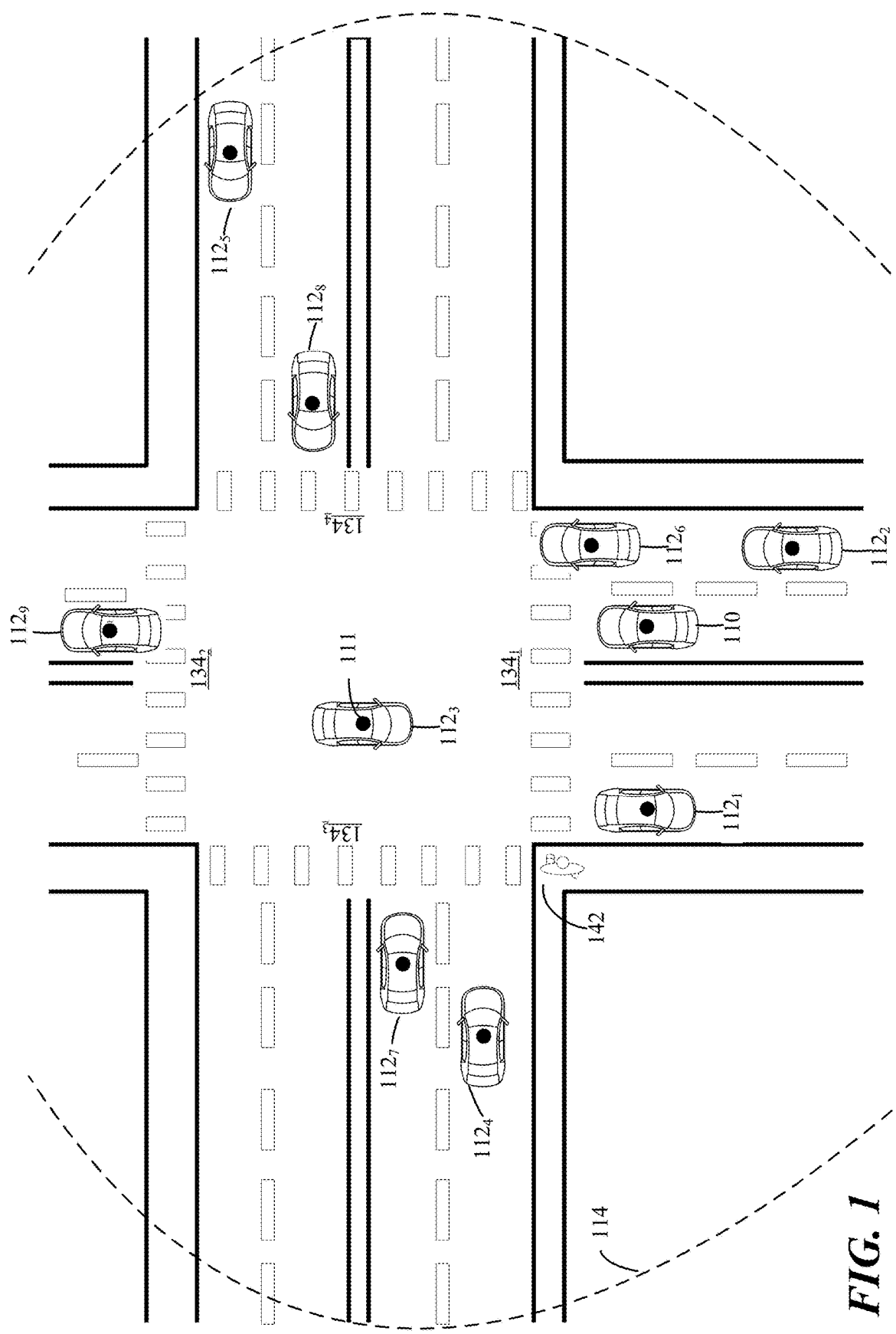
FIG. 1 is an illustration of an intersection of two divided highways having automated vehicles travelling on the highways within a perimeter with a pedestrian assessing the risk of entering a crosswalk in the presence of moving vehicles, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In the present disclosure, "pedestrian" is defined as any of a pedestrian, a bicyclist, a human powered conveyance and or the like. "Pedestrian" as defined in the present disclosure does not include motorized vehicles, such as automated or self-driving vehicles or manually driven vehicles.

"Automated vehicle" is defined as a vehicle capable of navigating roadways and interpreting traffic-control devices without a driver actively operating some or all of the vehicle's control systems. "Automated vehicle" includes fully autonomous vehicles.

An automated vehicle may be capable of sensing its environment and navigating with little or no user input. It senses the environment by using vehicle sensing devices such as radar, LiDAR, cameras, and the like. Automated vehicles further use information from global positioning systems (GPS) technology, navigation systems, vehicle-to-vehicle (V2V) communication, vehicle-to-infrastructure (V2I) technology, and/or drive-by-wire systems to navigate the vehicle.

Automated vehicles typically include communication systems which are capable of exchanging information with other nearby automated vehicles about their trajectories, speed, intent to make turns, etc. A vehicle which includes a communication system is called a "connected vehicle" and may be fully automated, semi-automated or manual.

An automated vehicle, as defined in the present disclosure, is a vehicle which is capable of self-driving without a human driver at SAE level 4 or higher of the SAE International J3016 standard (See "Automated driving levels of driving automation are defined in new SAE International Standard J3016", SAE International, 1 Jul. 2018, incorporated herein by reference in its entirety). The SAE (J3016) automation levels for higher automation levels are shown in Table 1. The automation levels 4-5 show the degree of control for automated vehicles. At each level, the vehicle monitors the driving environment.

TABLE 1

| | | SAE (J3016) Automation Levels | | | | |
|---|---|---|---|---|---|---|
| SAE Level | Level of Automation | Driving mode-specific performance by automated driving system | Executes steering, acceleration, deceleration | Monitoring of driving environment | Fallback performance of dynamic driving task | System capability (driving modes) |
| 3 | Conditional | Human driver controls upon request | System | System | Human Driver | Some Driving Modes |
| 4 | High | System control when human driver does not respond appropriately | System | System | System | Many Driving Modes |

TABLE 1-continued

SAE (J3016) Automation Levels

| SAE Level | Level of Automation | Driving mode-specific performance by automated driving system | Executes steering, acceleration, deceleration | Monitoring of driving environment | Fallback performance of dynamic driving task | System capability (driving modes) |
|---|---|---|---|---|---|---|
| 5 | Fully Autonomous | System control under all roadway and environmental conditions that can be managed by a human driver | System | System | System | All Driving Modes |

Aspects of the present disclosure are directed to an automated vehicle system for broadcasting a group mode status of automated vehicles travelling towards or within a roadway intersection, a method for broadcasting a visual signal representing a group mode status of automated vehicles travelling towards or within a roadway intersection and a non-transitory computer readable medium having instructions stored therein that, when executed by one or more processors, cause the one or more processors to perform a method for broadcasting a visual signal representing a group mode status of automated vehicles travelling towards or within a roadway intersection.

The present disclosure describes a vehicle automation connected pedestrian risk assessment device which provides a signaling mechanism which allows a pedestrian to assess the number of vehicles under control of an automated system in the vicinity of the pedestrian. In particular, an automated vehicle alerts nearby pedestrians regarding the ratio or percentage of automated versus manually driven vehicles via an alerting system to inform the pedestrian of their risk from manually driven vehicles.

A vehicle under automated control (e.g., SAE Level 4 and higher) determines the ratio or percentage of surrounding vehicles under automated control to manual control within a predetermined radius (e.g., 1/10 mile) using, e.g., vehicle-to-vehicle (V2V) communication, cameras, other vehicle sensors, etc. If the vehicle under automated control determines that all of the vehicles within the radius are also under automated control, that vehicle broadcasts a specific signal to the external environment by an external mode indicator 111, e.g., flashes a blue light located on the roof of the vehicle. If one or more vehicles within the predetermined radius are under manual control, the vehicle will broadcast a different signal, e.g., flash a red light. The choice of a blue light or a red light on the roof of a vehicle is not limiting, and may be any color of light or display. The external mode indicator 111 may be a round rotating light, a lighted display on the roof of the vehicle, a light bar, a display showing text, such as "A" for automated mode and "M" for manual mode, a display showing the ratio, such as "10/2", "8/3", "3/5", etc., and or the like. Additionally, the external mode indicator may flash at different frequencies or in a pattern to indicate the ratio.

In an aspect of the present disclosure, the automated vehicle may communicate a signal including the ratio or percentage to an infrastructure display, such as a street light, a crosswalk sign, a display on a nearby building, or the like via vehicle-to-infrastructure (V2I) communications.

In a non-limiting example, as shown in FIG. 1, a subject vehicle 110 under automated control (e.g., SAE Level 4 and higher) determines the number of vehicles under automated control to the vehicles under manual control within a predetermined radius (radius of dotted line circle 114 from vehicle 110) (e.g., 1/10 mile) using, e.g., vehicle-to-vehicle (V2V) communication, cameras, other vehicle sensors, etc. If the subject vehicle 110 under automated control determines that all of the vehicles within the radius are also under automated control, as in the example of FIG. 1, the subject vehicle 110 broadcasts the specific signal to the external environment, e.g., flashes a blue light located on the roof of the vehicle or on an infrastructure display. Therefore, the subject vehicle displays the blue light unless there are non-automated vehicles within the area defined within the perimeter 114. The blue light need not flash, but can be solidly blue as long as no non-automated vehicles are detected within the perimeter. Additionally, the percentage of automated versus non-automated vehicles can be displayed as 100%. The subject vehicle 110 can display the percentage on a display screen on the roof, front windshield or other easily viewable location on the subject vehicle 110. As shown in FIG. 1, a pedestrian can view the oncoming traffic and determine by the subject vehicle 110 "mode" light or external mode indicator display that the surrounding vehicles are under automated control and can cross the intersection with associated confidence that the vehicles will recognize and respond to his presence.

Figure 2:
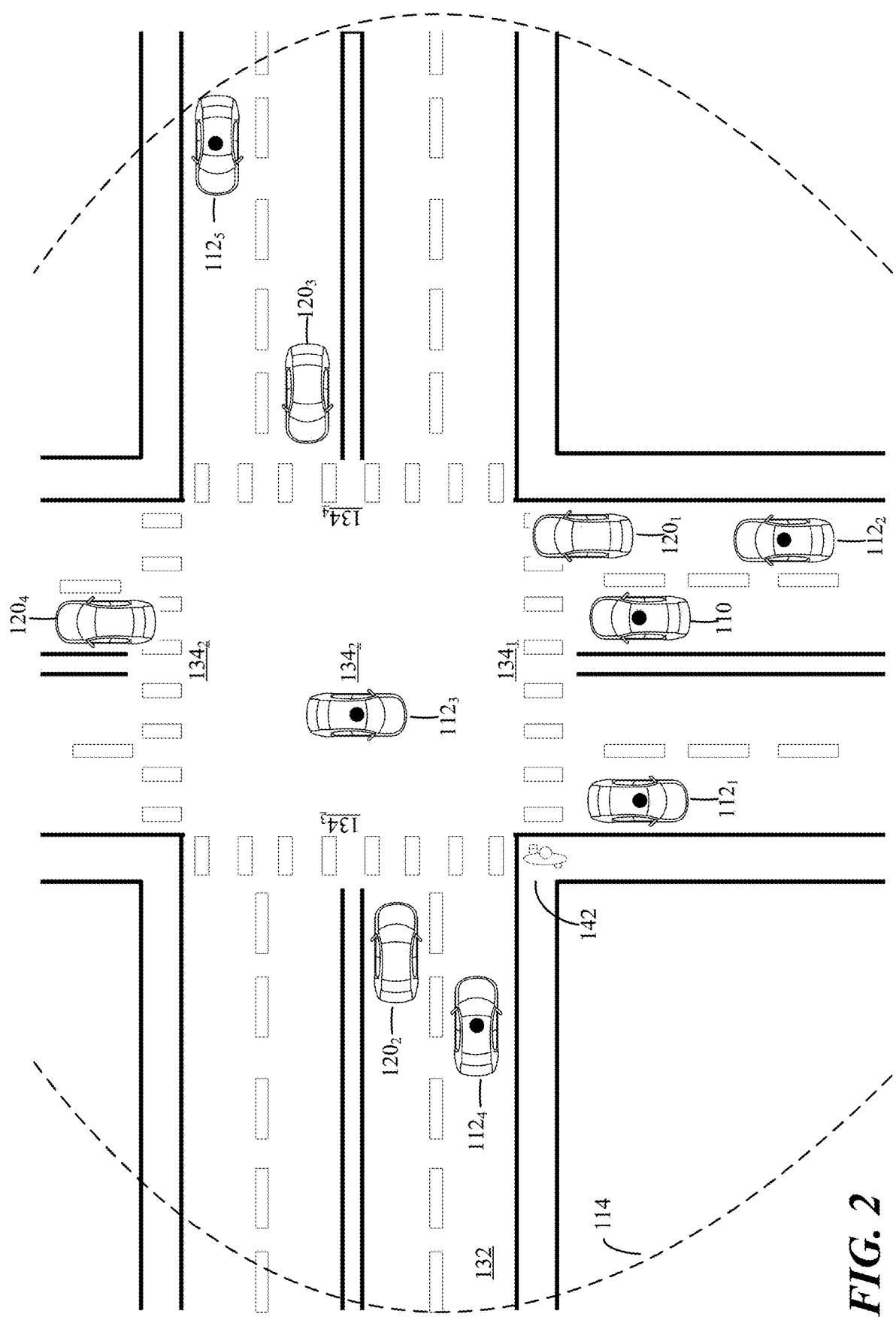
FIG. 2 is an illustration of an intersection of two divided highways having automated and non-automated vehicles travelling on the highways within a perimeter with a pedestrian assessing the risk of entering a crosswalk in the presence of moving vehicles, according to certain embodiments.

In another non-limiting example, as shown in FIG. 2, the subject vehicle 110 under automated control determines the ratio or percentage of surrounding vehicles under automated control (vehicles $112_1$-$112_5$) to the vehicles under manual control ($120_1$-$120_4$) within the perimeter 114. In this situation, one or more vehicles within the predetermined radius are under manual control, therefore the subject vehicle will broadcast a different signal, e.g., flash a red light. As shown in FIG. 2, a pedestrian can view the oncoming traffic and determine by the vehicle "mode" light on vehicle 110 that some of the surrounding vehicles are not automated and make an informed decision as to whether to cross the intersection. Additionally, as the non-automated vehicle $120_4$ is moving away from the intersection and is no longer a danger, non-automated vehicles $120_2$ and $120_3$ are stopped, and non-automated vehicle $120_1$ will have passed through the crosswalk $134_1$ before the pedestrian enters, the pedestrian can ascertain the danger of entering the crosswalk with a high level of confidence that the only vehicles of concern are automated vehicles, which will take appropriate action with respect to his movements. In the non-limiting example of FIG. 2, the ratio of the automated vehicles to non-automated vehicles within the area surrounded by the dotted line 114 is 6:4 or 60%. In this situation, the vehicle would display a red light so that the pedestrian can determine whether or not to enter the crosswalk $134_1$.

Alternatively, different broadcast methods can be used for the automated assessment to give the road user more information. For example, instead of the binary blue/red broadcast, more colors or light bars can be used to give percentages of vehicles under automated control, e.g., blue for 100%, yellow for 75%, red for 25%, etc. Alternatively, the vehicle $112_4$ may flash a red light at different frequencies or in different patterns or intensities which indicate the ratio of automated to non-automated vehicles. In a non-limiting example, the frequency may be 2 Hz (2 light flashes per second, or at 0.5 second intervals). Each percentage category (25%, 50%, 75%, 100%) may have a cycle of four lights, in bright or dim intensities, shown in succession. The cycle repeats while the automated vehicle is near the pedestrian or a non-automated vehicle. When the percentage is less than 25%, the display shows four bright flashes. When the percentage is 25%, three bright light flashes are followed by one dim light flash. When the percentage is 50%, two bright light flashes are followed by two dim light flashes. When the percentage is 75%, one light flash is followed by three dim light flashes. When the percentage is 100%, the light stays on continuously until the percentage changes. When the percentage is 100%, the light may change color, e.g., from red to blue.

In an additional aspect of the present disclosure, the automated vehicle may communicate a signal including the ratio or percentage to a wearable or portable wireless device carried by the pedestrian, such as a smart phone, smart watch or hand-held tablet via vehicle-to-infrastructure communications (V2I).

The wireless device may display the ratio of automated to non-automated vehicles, a percentage of automated to non-automated vehicles, or provide a quickly read display of the positions of the automated and non-automated vehicles and an indication of the speed of each vehicle. For example, the speed of a vehicle may be indicated by a color spectrum or by grayscale intensities. In a non-limiting example, the color spectrum may begin at red, indicating high velocity and end with green, indicating low velocity. Automated vehicles on the display may flash, for example, as flashing dots. Non-automated vehicles may not flash, but may have their velocities indicated by the color spectrum. The method of displaying the automated and non-automated vehicles on a wireless device display is not limited by the above examples, and may be any type of display which a road user, such as a pedestrian, can use to quickly assess the danger of entering the crosswalk. For example, if the road user is a bicyclist in motion, the bicyclist may not be able to look at a smartphone display for more than one second and must be able to decide whether or not it is safe to enter the crosswalk within a short time period.

Additionally, existing sensors on the vehicle, may be used to provide data to interpret pedestrian intent, e.g., will the pedestrian step into the intersection, is the pedestrian looking down at a smartphone, etc. The data may be analyzed by an onboard computer of the automated vehicle, which may include a vehicle automation connected pedestrian risk assessment unit, which determines the intent of the pedestrian to enter the crosswalk by analyzing his/her movements, gaze direction, speed of walking, and the like. The onboard computer may use machine learning or artificial intelligence modules to determine the intent of the pedestrian.

Referring again to FIG. 1, if a plurality of vehicles under automated control, each including the vehicle automation connected pedestrian risk assessment device, determine that the pedestrian 142 is about to step into the pedestrian crosswalk $134_1$, the vehicles under automated control can begin to flash blue (e.g., signifying 100% automated control in the radius) after vehicles $112_1$ and $112_6$, clear the crosswalk $134_1$. The vehicle $112_1$ under automated control in the lower left lane that has already passed the crossing can stop broadcasting so as not to confuse the pedestrian. Vehicle $112_9$ has passed the intersection, and thus can also stop broadcasting. Other road user intent-based broadcasting scenarios are possible.

The external mode indicator can also be a blue or green color or other color or shape designating an automated or semi-automated mode. This advantageously allows the external mode indicator to be distinguishable from the white, red and yellow lights traditionally found on vehicles.

The light pattern or intensity can be related to the pedestrian risk assessment. For example, the pedestrian movement estimator may analyze the pedestrian's walking speed. A pedestrian may run across the street, rather than walk, to minimize the time spent in the street to lower the chances of having a crossing incident. Such a pedestrian who is running may not notice the "100% AV" sign or blue dome light which could help the pedestrian feel safer and inform decision making processes such as choosing a slower speed of crossing. Based on the pedestrian risk assessment, the automated vehicle may temporarily increase the brightness of the information display or change the intensity or pattern of the dome light to draw attention and increase the likelihood that the pedestrian will see the message display. The information in the message display may help the pedestrian to feel safer and slow his/her speed/gait which can lower his/her propensity to fall and increase the chances of crossing without incident.

The external mode indicator may be a round or dome shaped light on the roof, as described above. However, the external mode indicator is not limited to a round or dome shaped light on the roof, and may be a light bar, a display with symbols or text, a display which flashes colors in a pattern, and or the like. Although preferentially placed on the roof so that it can be seen from all directions, the external mode indicator is not limited to the roof as a display location, and may be placed on a front windshield or a front grill or any other location easily viewable from the pedestrian's point of view.

Figure 3:
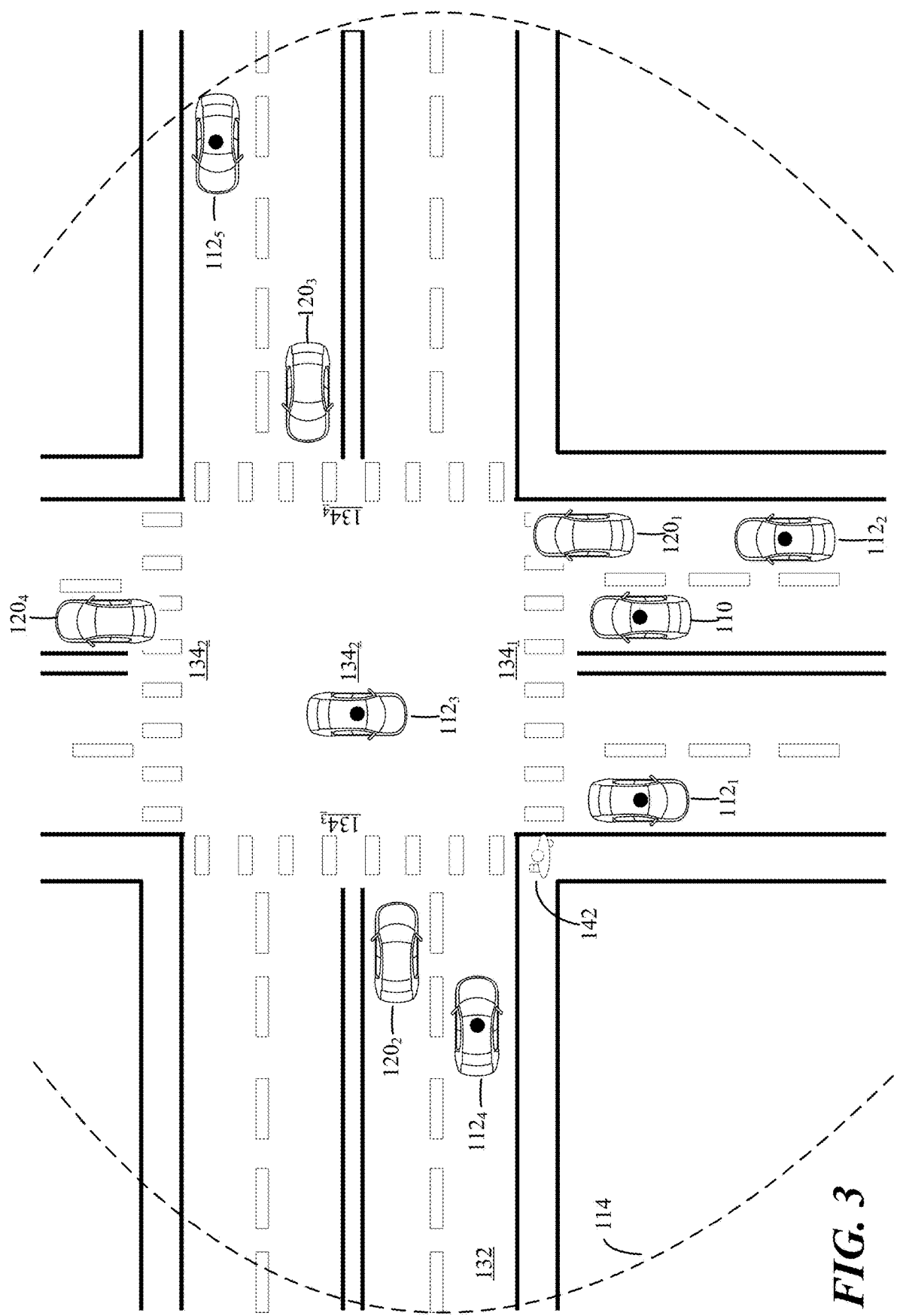
FIG. 3 is an illustration of an intersection of two divided highways having automated and non-automated vehicles travelling on the highways within a perimeter with a pedestrian assessing the risk of crossing a different crosswalk than that of FIG. 2, according to certain embodiments.

As shown in FIG. 3, the pedestrian 142 is poised to enter crosswalk $134_3$, where non-automated vehicles $120_2$ and $120_3$ are stopped. Automated vehicle $112_4$ is approaching the crosswalk $134_3$ from the left and is expected to stop at crosswalk $134_3$. Automated vehicle $112_5$ is approaching crosswalk $134_4$ from the right and is expected to stop at crosswalk $134_4$. In this situation, the pedestrian cannot see the subject vehicle 110. However, the subject vehicle 110 may communicate a signal including the ratio or percentage to the automated vehicles $112_4$ and $134_2$, which are in the field of view of the pedestrian 142, to request the display of the percentage or ratio on their displays. In this way, the pedestrian 142 can visually assess the danger of entering crosswalk $134_3$ when there are non-automated vehicles travelling to his/her right.

Figure 4:
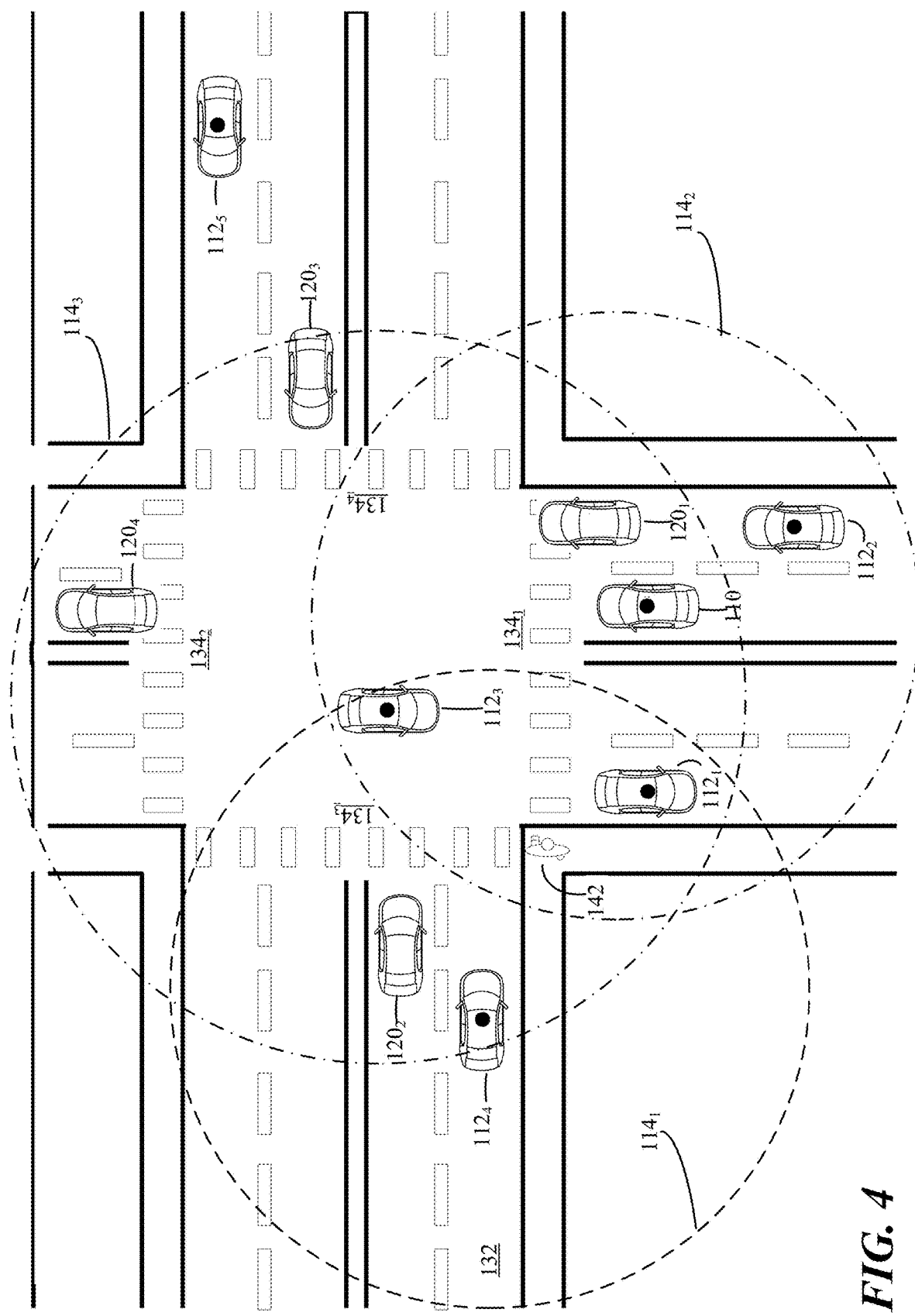
FIG. 4 is an illustration of perimeters set about a plurality of automated vehicles, according to certain embodiments.

As shown in FIG. 4, if there are a plurality of automated vehicles including the vehicle automation connected pedestrian risk assessment device, each vehicle will broadcast the blue or red light depending on the ratio of automated to non-automated vehicles it detects within a perimeter defined by a radius originating on the vehicle. For example, within a perimeter $114_1$ defined by a radius centered on vehicle $112_4$, vehicles $112_3$ and $112_4$ may flash red lights, due to the presence of non-automated vehicle $120_2$, and vehicle $112_1$ may turn off its external mode indicator as it has passed the crosswalks. Alternatively, vehicles $112_3$ and $112_4$ may show a ratio "3:1" or a percentage "75%" indicating the number of automated vehicles to non-automated vehicles. Again, vehicle $112_1$ is within the perimeter and included in the calculation of automated to non-automated, but may turn off its external mode indicator as it has passed the crosswalks.

Within the perimeter $114_2$ centered on vehicle 110, the pedestrian is detected as attempting to enter crosswalk $134_1$, as shown in FIG. 1. Automated vehicles $112_1$, $112_2$ and $112_3$ also detect the pedestrian within their respective perimeters. Vehicle 110 counts itself and automated vehicles $112_1$, $112_2$ and $112_3$ and detects non-automated vehicle $120_1$, thus displays or indicates a ratio of 4:1 on a display or a percentage of 80% by the frequency of the flashing red light, on a light bar or the like.

Within the perimeter $114_3$ centered around automated vehicle $112_3$, automated vehicles $112_4$, $112_1$, 110 and non-automated vehicles $120_1$, $120_2$, $120_3$, $120_4$ are detected, thus the ratio of automated to non-automated vehicles is 4:4 or 50%. In this situation, vehicles $112_1$ may suppress its mode light as it has already passed the crosswalk.

The calculation of the visual signal can generate a percentage or a ratio. The subject automated vehicle uses its external sensors to detect vehicles and pedestrians in the defined area. The computing unit includes image processing circuitry which can calculate a first total number of vehicles. The computing unit can communicate with other automated vehicles through its vehicle-to-vehicle communications unit 789 to receive the mode status of each automated vehicle in the area, wherein the mode status is 1 if the other automated vehicle is operating in automated mode and is 0 if the other automated vehicle is operating in non-automated mode, sum the mode statuses and add one to represent itself, and generate a second total number representing the number of automated vehicles in the area operating in automated mode. A percentage can be calculated by dividing the second total number by the first total number and multiplying by 100. Alternatively, a ratio of automated vehicles to non-automated vehicles (including automated vehicles operating in manual mode), subtracting the second total number from the first total number to generate a third total number, and showing the group mode status as a ratio of the second total number to the third number.

Figure 5B:
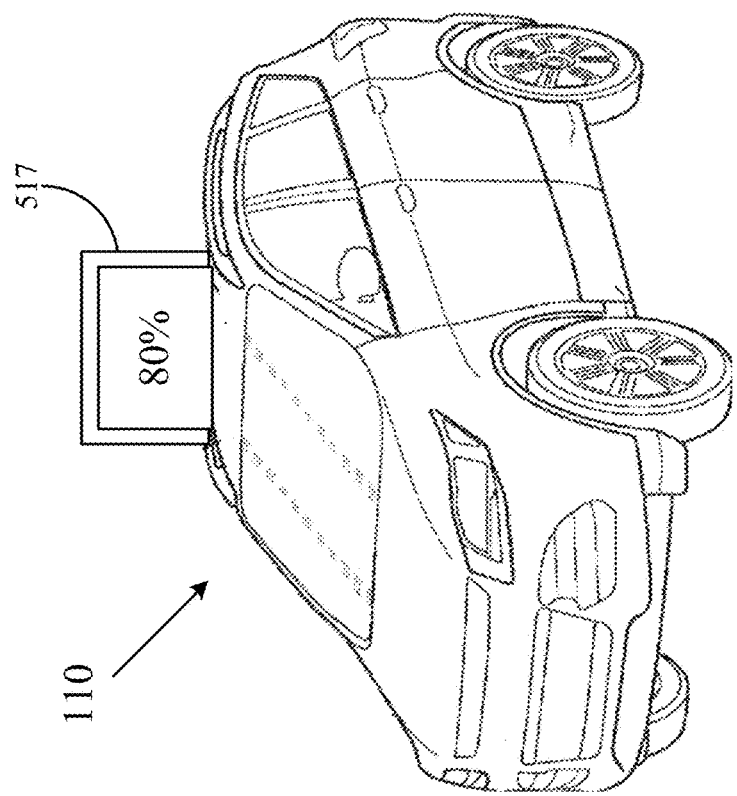
FIG. 5B illustrates an external mode indicator which displays a percentage, according to certain embodiments.
Figure 5A:
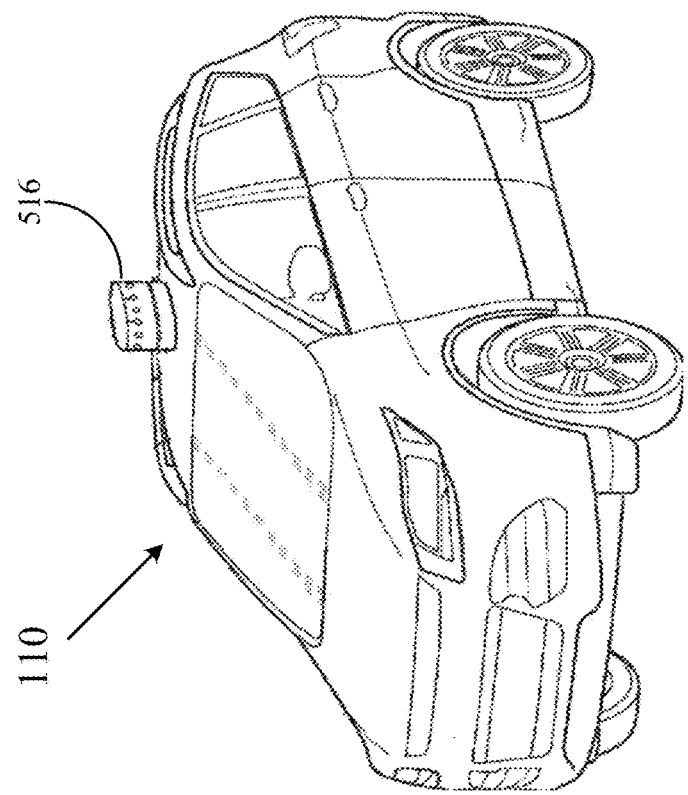
FIG. 5A illustrates an external mode indicator which is in the shape of a dome, according to certain embodiments.

As shown in FIG. 5A, the exterior mode indicator 111 may be a dome 516 on the roof of the subject vehicle 110, wherein the dome flashes a specific color to indicate one or more automated vehicles in the area defined by a perimeter around the automated vehicle and a different color to indicate one or more non-automated vehicles. The external mode indicator need not flash, but may be a solid color, such as blue for automated vehicles and red when non-automated vehicles are detected in the area. Additionally, the external mode indicator may flash at a rate which indicates the ratio or percentage of automated to non-automated vehicles. The colors are not limited, but may preferentially be blue, red, purple or turquoise.

As shown in FIG. 5B, the exterior mode indicator may be a display 517 on the roof of the subject vehicle 110, which displays the percentage of automated vehicles within the perimeter. For example, if the number of vehicles within the perimeter is five and four are automated, the percentage is 80%.

Figure 5C:
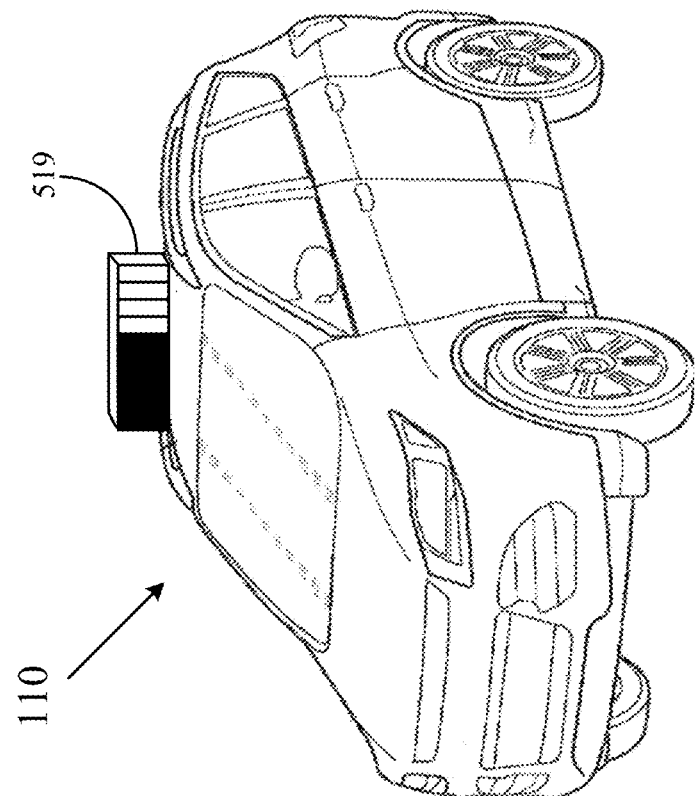
FIG. 5C illustrates an external mode indicator which displays a ratio, according to certain embodiments.

As shown in FIG. 5C, the exterior mode indicator may be a display 518 on the roof of the subject vehicle 110, which displays the ratio of automated vehicles within the perimeter. For example, if the number of vehicles within the perimeter is five and four are automated, the ratio is 4:1 and the display may broadcast "A 4", "M 1".

Figure 5D:
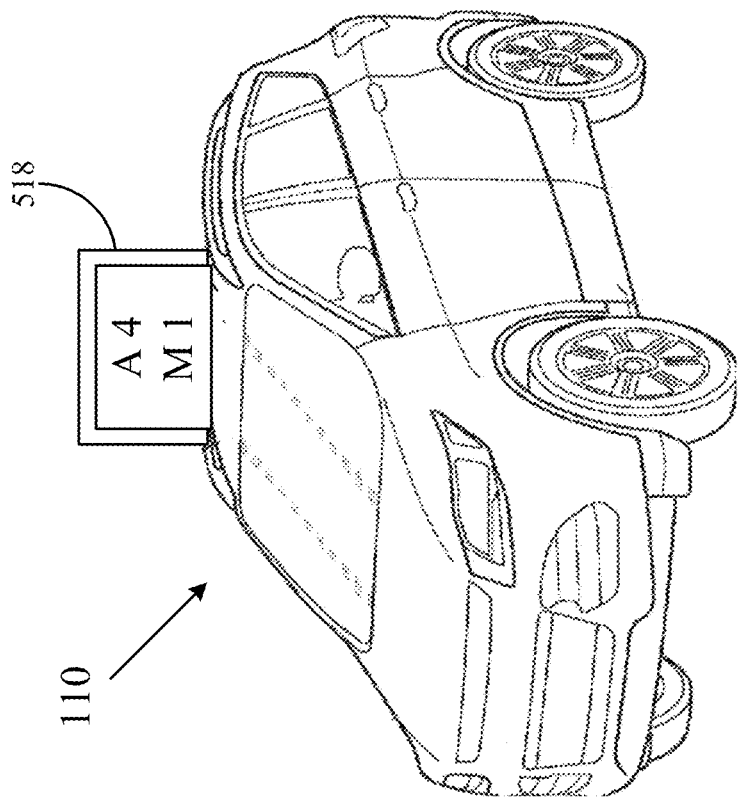
FIG. 5D illustrates an external mode indicator which is a light bar for displaying a percentage, according to certain embodiments.

As shown in FIG. 5D, the exterior mode indicator may be a light bar 519 on the roof of the subject vehicle 110, which broadcasts the percentage by lighting a series of lights on the display screen. In the non-limiting example shown in FIG. 2, where automated vehicle 110 counts six automated vehicles and four non-automated vehicles, light bar 519 is lit so that six of the light segments are illuminated, which represents 60% of the vehicles within the perimeter. The light bar segments can also be colored to allow the pedestrian to read the display more easily, for example, the segments may be colored blue for 100%, yellow for 75%, purple for 50% and red for 25%, etc. The pattern and/or set of colors may be any pattern or set of colors and is not limited by the above examples.

Figure 6:
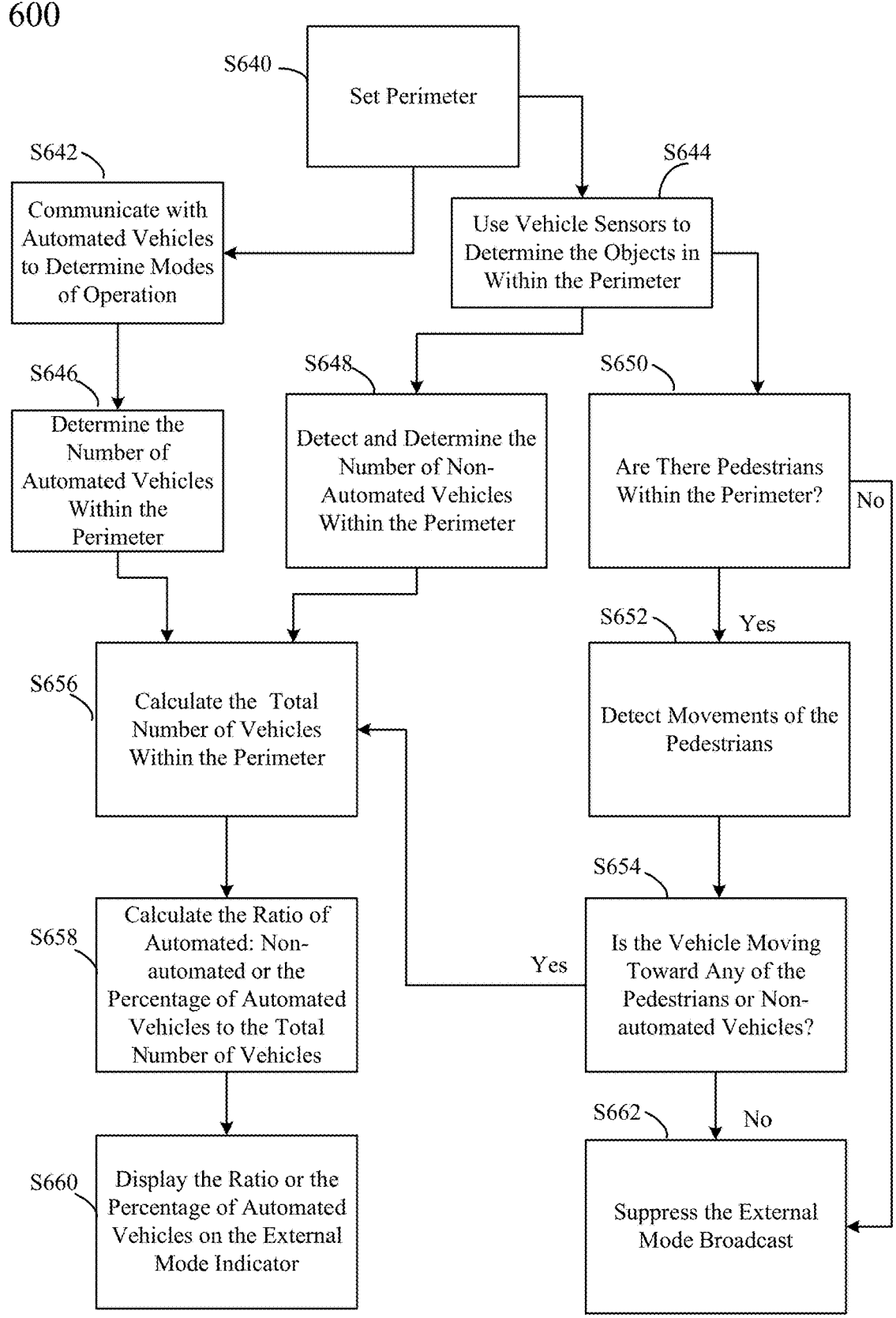
FIG. 6 is a flowchart of the process for broadcasting the external mode signal, according to certain embodiments.

FIG. 6 is a flowchart depicting the processes 600 followed by the automated vehicle to determine the ratio or percentage of automated to non-automated vehicles. In step S640, subject vehicle 110 sets a detection perimeter 114 at a predetermined radius from the center of the vehicle. The predetermined radius may be in the range of 25 feet to 525 feet (about ⅒ mile) as determined by type of highway, density of traffic, existence of traffic lights, speed limits, and the like, and may be different when the vehicle travels from one location to the next.

In step S642, the vehicle 110 uses vehicle-to-vehicle communications to communicate with automated vehicles in the surrounding area. A request is made for each automated vehicle to share its mode of operation. At step S646, the vehicle 110 determines how many automated vehicles are within the perimeter.

At step 644, the vehicle 110 uses its external vehicle sensors to identify pedestrians (such as pedestrian 142, FIG. 1) and non-automated vehicles (such as any of 112, FIG. 1-4) within the perimeter.

At step 648, the vehicle 110 detects the number of non-automated vehicles within the perimeter. At step S650, the vehicle 110 determines whether there are any pedestrians within the perimeter and, if so, at S652 detects the movements of the pedestrians. If there are no pedestrians within the perimeter, the process moves to S662, where the external mode broadcast is suppressed. At S654, the vehicle 110 determines whether the vehicle is moving toward the pedestrian or a non-automated vehicle. If the vehicle is not moving towards any pedestrian or non-automated vehicle, the external mode broadcast is suppressed at S662. This situation was previously described with respect to automated vehicle $112_1$ of FIG. 1, who is moving away from the pedestrian. If the vehicle is moving toward a pedestrian, the process moves to step S656, where the total number of vehicles within the perimeter is calculated. At step S658, the ratio of automated to non-automated vehicles and/or percentage of automated vehicles to the total number of vehicles is calculated. At step S660, the ratio or percentage is displayed on the external mode indicator.

The subject vehicle 110 is an automated vehicle. As used herein, "automated vehicle" means a vehicle that is configured to operate in an automated mode. "Automated mode" means that one or more computing systems are used to navigate and/or maneuver the vehicle along a travel route with minimal or no input from a human driver. In one or more arrangements, the vehicle 110 can be highly automated, such as defined by SAE Level 4 and higher as shown in Table 1. Vehicles defined by SAE Level 3 may be considered to be automated in the instance when control has shifted from a driver to the driving system. Such switching can be implemented in any suitable manner, now known or later developed. "Manual mode" means that a majority of the navigation and/or maneuvering of the vehicle along a travel route is performed by a human driver. Particulars of an automated vehicle, such as navigation system, sensors, human signal recognition, external displays, automated mode external mode indicators, and the like have been described in U.S. Pat. Nos. 9,855,890 B2, 9,694,813 B2 and 9,809,158 B2, each incorporated herein by reference in its entirety.

Figure 7:
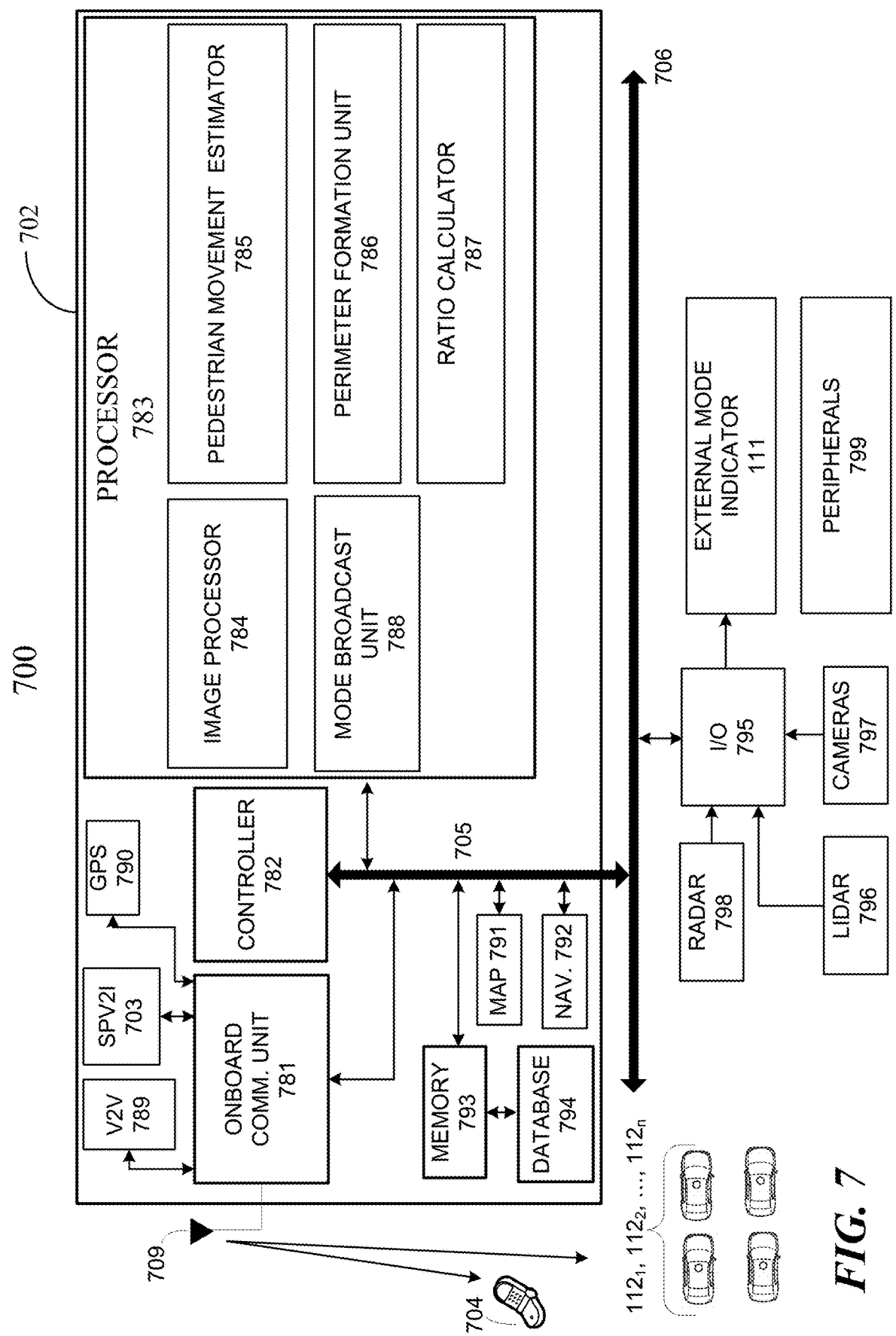
FIG. 7 is a block diagram of the computing environment, according to certain embodiments.

As illustrated in FIG. 7, an automated vehicle may include a guidance system which makes use of vehicle cameras 797, LiDAR scanners 796 and/or radar data 798 to determine the surrounding environment and moving objects. The automated vehicle may also connect in a vehicle-to-vehicle (V2V) communications (see V2V unit 789) protocol with nearby automated vehicles ($112_1, 112_2, \ldots, 112_n$, where n is the total number of automated vehicles within a defined perimeter) to determine their mode statuses. The guidance system may include an image processor 784 which can use camera images, 3D point cloud and radar data to stitch together a representation of the surroundings of the automated vehicle. Movement within the surrounding environment can include current traffic and roadway conditions, nearby entities, automated or non-automated vehicle speed, direction, and other data. Object recognition and computer vision techniques may be applied to the image data to identify pedestrians, bicyclists and non-automated vehicles, as well as intersections and crosswalks.

Sensor data from at least one of the cameras, LiDAR scanners, radar sensors, and the like may be used to form images of the surrounding environment. As an example, a pedestrian head pose and body posture may be derived from a depth map and appearance information (such as color contrasts, intensity, etc.) from the sensor data, and detect pedestrian candidate regions (such as via a bounded point cloud input of LIDAR-based sensor devices, image recognition via imaging-based sensor devices, etc.) based on a comparison with human shape models to render a detected pedestrian object, and the position and movements of the pedestrian relative to the automated vehicle. As may be appreciated, various object recognition methods may be used alone and/or in combination, such as an alignment methodology (e.g., using points, smooth contours, etc.), invariant properties methodology in which properties may be common to multiple views (e.g., color indexing, geometric hashing, moments, etc.), parts decomposition methodology (e.g., objects having natural parts, such as nose, eyes, mouth) for facial recognition, etc.

The computing unit 702 may include a pedestrian movement estimator 785 which uses information from the image processing to monitor the body movements of the pedestrian over a series of images. Such movement identification may also be based on movement examples through machine learning based techniques (for example, convolutional neural networks, HOG detectors, random forests, support vector machines, etc.).

The computing environment 700 of the subject automated vehicle 110 includes a computing unit 702 which determines whether the vehicle 110 is operating with automated or semi-automated features and automatically controls the illumination of the external mode indicator 116. The computing unit has a controller 782 which is further configured to operate the cameras, LiDAR sensors and radar sensors of the vehicle to image the surrounding environment. The computing unit includes an image processor 784 and a processor 783, such as a CPU or an ECU. The computing unit includes a memory 793 storing program instructions which may be accessed by the image processor 784 and/or the processor 783. A database 794 may hold identification data for communicating between vehicles, datasets of images used by the image processor to compare with current images to determine pedestrian movements, identify non-automated vehicles, etc. The image processor 784 includes circuitry configured to execute the program instructions to receive the images from the cameras 797, LiDAR sensors 796 and radar data 798, timestamp the images and provide timestamped images to the processor 783 for further analysis. The processor is configured to access the program instructions to perform aspects of the present disclosure. The processor is configured with pedestrian movement estimator 785 having program instructions configured to identify a pedestrian and his/her movements over a series of images.

The computing unit further includes a vehicle-to-vehicle communication unit 789 connected to the onboard communications unit 781 and configured for sending and receiving the mode statuses to/from the surrounding vehicles ($112_1, 112_2, \ldots, 112_n$, where n is the number of automated vehicles within the perimeter).

The computing unit further includes a vehicle-to-infrastructure (V2I) communication unit 703 connected to the onboard communications unit 781 and configured for transmitting an external mode status to a pedestrian carried wireless device, such as a smartphone 704, smart watch or smart tablet.

The computing unit further may use the V2I communication unit 703 to communicate a signal including the ratio or percentage to infrastructure within the perimeter for broadcast on a display of the infrastructure. This display may be located on a street light, crosswalk light, a sign post, or the like which is configured to receive signals.

The computing unit further includes a GPS unit 790 for accessing GPS information for navigational purposes, an internal map 791 and navigation unit 792. The global positioning satellite (GPS) unit is capable of receiving information from global navigation satellite system (GNSS) satellites and calculating the vehicle's geographical position. The navigation unit 792 uses the positioning information provided by the GPS antenna to determine the coordinates of the vehicle and positions of surrounding vehicles from a satellite map. The navigation unit 792 stores information that is required for route guidance and to display maps. Peripherals 799 generally include a display, speakers and control panel for programming route information into the navigation unit.

The processor 783 includes circuitry and program instructions configured to form a sensing perimeter about the subject vehicle (see perimeter formation unit 786), receive V2V communications from surrounding automated vehicles ($112_1, 112_2, \ldots, 112_n$) and determine the number of automated vehicles within the perimeter. The image processor 784 identifies the number of non-automated vehicles from the vehicle sensors. The ratio calculator determines the ratio or percentage of automated to non-automated vehicles and the mode broadcast unit 788 configures the ratio or percentage for broadcast on the external mode indicator 111.

Bus 705 operatively connects the components of the computing unit. Bus 706 connects an I/O unit 795, further connected to vehicle sensors external mode indicator 111, and peripherals 799 to the communications bus 705.

The first embodiment is illustrated with respect to FIG. 1-11. The first embodiment describes an automated vehicle system for broadcasting a group mode status of automated vehicles travelling towards or within a roadway intersection (see FIG. 1-3), comprising a subject automated vehicle 110 including a vehicle-to-vehicle communications unit (789, FIG. 7) configured to communicate with other automated vehicles ($112_1$, $112_2$, ..., $112_n$, where n is the number of automated vehicles in the area, FIGS. 1-4) within an area surrounding the subject automated vehicle and receive a mode status from each other automated vehicle, wherein the mode status reflects whether the other automated vehicle is operating in automated mode and or in non-automated mode, at least one external vehicle sensor (LiDAR, cameras, radar, not shown) configured to generate data upon detecting vehicles (vehicles 112 and 120) or pedestrians 142 within the defined area, an external mode indicator (516-519, FIG. 5A-5D or smartphone 704, FIG. 7) configured to broadcast a visual signal, a computing unit 702 operatively connected to the vehicle-to-vehicle communications unit 789, the at least one external vehicle sensor and the external mode indicator, the computing unit including a computer-readable medium having program instructions, executable by processing circuitry, to cause the processing circuitry to define the area by a radius which is centered on the subject automated vehicle (see various perimeters $114_1$, $114_2$, $114_3$ shown in FIG. 4; perimeter formation unit 786, FIG. 7), determine whether there are any pedestrians near the roadway intersection, when there are pedestrians near the roadway intersection, calculate the group mode status, generate a visual signal representing the group mode status, and actuate the external mode indicator to broadcast the visual signal.

The computing unit of the system is further configured to suppress the broadcast of the visual signal when there are no pedestrians near the roadway intersection.

The processing circuitry is further configured to identify all automated and non-automated vehicles in the area from the data, calculate a first total number of the automated and non-automated vehicles in the area, the first total number including the subject automated vehicle, calculate a second number of automated vehicles operating in automated mode in the area from the mode statuses, divide the second number by the first total number and multiply by 100 to calculate a percentage of automated vehicles operating in automated mode in the area, and the computing unit is further configured to broadcast the group mode status as the percentage on the external mode indicator.

The computing unit is further configured to actuate the external mode indicator to broadcast the visual signal in a first color when the percentage is 100%, and broadcast the visual signal in a second color when the percentage is less than 100%.

The processing circuitry is further configured to generate visual signal frequencies to actuate the external mode indicator to flash the first color at a first frequency when the percentage is 100%, flash the second color at a second frequency when the percentage is less than 100% and greater than or equal to 75%, flash the second color at a third frequency when the percentage is less than 75% and greater than or equal to 50%, flash the second color at a fourth frequency when the percentage is less than 50% and greater than or equal to 25%, and flash the second color at a fifth frequency when the percentage is less than 25% and greater than or equal to zero.

The external mode indicator may be a display screen (517, FIG. 5B; 518, FIG. 5C) located on the roof of the subject automated vehicle, wherein the display screen is configured to display at least one of text and numbers, and the computing unit is configured to display the percentage as one of text and numbers.

The external mode indicator may be a light bar (519, FIG. 5D) located on the roof of the subject automated vehicle, wherein the light bar comprises a series of light segments, and the computing unit is configured to display a magnitude of the percentage by lighting a related percentage of the light segments.

The processing circuitry is further configured to identify automated and non-automated vehicles in the area from the data, calculate a first total number of automated and non-automated vehicles in the area, the first total number including the subject automated vehicle, calculate a second number of automated vehicles operating in automated mode in the area from the mode statuses; subtract the second number from the first total number to generate a third number representing the number of non-automated vehicles and automated vehicles operating in non-automated mode within the area, and broadcast the group mode status on the external mode indicator as a ratio of the second number to the third number.

The computing unit is further configured to broadcast the visual signal in a first color when the second total number equals the third number, and broadcast the visual signal in a second color when the second total number is less than the third number.

The external mode indicator may be a display screen located on the roof of the subject automated vehicle, wherein the display screen is configured to display at least one of text and numbers, and wherein the computing unit is configured to display the ratio as one of text and numbers.

The external mode indicator may be a dome light (516, FIG. 5A) located on the roof of the subject automated vehicle and the visual signal is broadcast as one of a first color indicating that all of the vehicles in the area are automated vehicles, and a second color indicating that some of the vehicles in the area are non-automated vehicles or are automated vehicles having a non-automated mode status.

The system further comprises a vehicle-to-infrastructure communications unit (703, FIG. 7) operatively connected with the computing unit, wherein the processing circuitry is configured to determine if a pedestrian is entering a crosswalk ($134_1$, $134_2$, $134_3$, $134_4$, FIG. 1-4) of the roadway intersection, wherein the processing circuitry is configured to determine if the pedestrian is carrying a wireless communication device, (such as a smartphone, 704, FIG. 7) in communication with the vehicle-to-infrastructure communications unit, and wherein the computing unit is configured to broadcast the group mode status to the wireless communication device.

The second embodiment is illustrated with respect to FIG. 1-11. The second embodiment describes a method for broadcasting a visual signal representing a group mode status of automated vehicles travelling towards or within a roadway intersection, comprising defining, with processing circuitry, an area around a subject automated vehicle by a radius which is centered on the subject automated vehicle (S640, FIG. 6), detecting, with external sensors of the subject automated vehicle, any pedestrians and vehicles within the area (S644), determining, with the processing circuitry, a first total number of vehicles in the area, receiving a mode status from each other automated vehicle in the area (S642), wherein the mode status reflects whether the other automated vehicle is operating in automated mode or in non-automated mode, determining, with the processing circuitry, whether there are any pedestrians near the roadway intersection (S650), when there are pedestrians near the roadway intersection calculating the group mode status (S654, S656, S658), generating a visual signal representing the group mode status, actuating, with computing circuitry, an external mode indicator to broadcast the visual signal (S660), when there are no pedestrians near the roadway intersection, suppressing the broadcast of the visual signal (S662).

The method further comprises calculating the group mode status by calculating a second number of automated vehicles operating in automated mode in the area from the mode statuses, dividing the second number by the first total number and multiplying by 100 to calculate a percentage of automated vehicles operating in automated mode in the area, and broadcasting, on the external mode indicator, the group mode status as the percentage.

The method further comprises generating, by the processing circuitry, visual signal frequencies representing the percentage, actuating the external mode indicator to flash a first color at a first frequency when the percentage is 100%, flash a second color at a second frequency when the percentage is less than 100% and greater than or equal to 75%, flash the second color at a third frequency when the percentage is less than 75% and greater than or equal to 50%, flash the second color at a fourth frequency when the percentage is less than 50% and greater than or equal to 25%, and flash the second color at a fifth frequency when the percentage is less than 25% and greater than or equal to zero.

The method further comprises calculating a second number of automated vehicles operating in automated mode in the area from the mode statuses, subtracting the second number from the first total number to generate a third number representing the number of non-automated vehicles and automated vehicles operating in non-automated mode within the area, and broadcasting the group mode status on the external mode indicator as a ratio of the second number to the third number.

The method further comprises determining, with the processing circuitry, whether a pedestrian is entering a crosswalk of the roadway intersection, determining whether the pedestrian is carrying a smartphone, and broadcasting the group mode status to the smartphone via a vehicle-to-infrastructure communications.

The third embodiment is illustrated with respect to FIG. 1-11. The third embodiment describes a non-transitory computer readable medium having instructions stored therein that, when executed by one or more processors, cause the one or more processors to perform a method for broadcasting a visual signal representing a group mode status of automated vehicles travelling towards or within a roadway intersection, comprising defining, with processing circuitry, an area around a subject automated vehicle by a radius which is centered on the subject automated vehicle, detecting, with external sensors of the subject automated vehicle, any pedestrians and vehicles within the area, determining, with the processing circuitry, a first total number of vehicles in the area, receiving a mode status from each other automated vehicle in the area, wherein the mode status reflects whether the other automated vehicle is operating in automated mode or in non-automated mode, determining, with the processing circuitry, whether there are any pedestrians near the roadway intersection, when there are pedestrians near the roadway intersection calculating the group mode status, generating a visual signal representing the group mode status, actuating, with computing circuitry, an external mode indicator to broadcast the visual signal, when there are no pedestrians near the roadway intersection, suppressing the broadcast of the visual signal.

The non-transitory computer readable medium method further comprises calculating the group mode status by calculating a second number of automated vehicles operating in automated mode in the area from the mode statuses, dividing the second number by the first total number and multiplying by 100 to calculate a percentage of automated vehicles operating in automated mode in the area, subtracting the second number from the first total number to generate a third number representing the number of non-automated vehicles and automated vehicles operating in non-automated mode within the area, generating a ratio of second number to the third number, broadcasting, on the external mode indicator, the group mode status as one of the percentage and the ratio.

The non-transitory computer readable medium method further comprises determining, with the processing circuitry, whether a pedestrian is entering a crosswalk of the roadway intersection, determining whether the pedestrian is carrying a smartphone, and broadcasting the group mode status to the smartphone via a vehicle-to-infrastructure communications.

Figure 8:
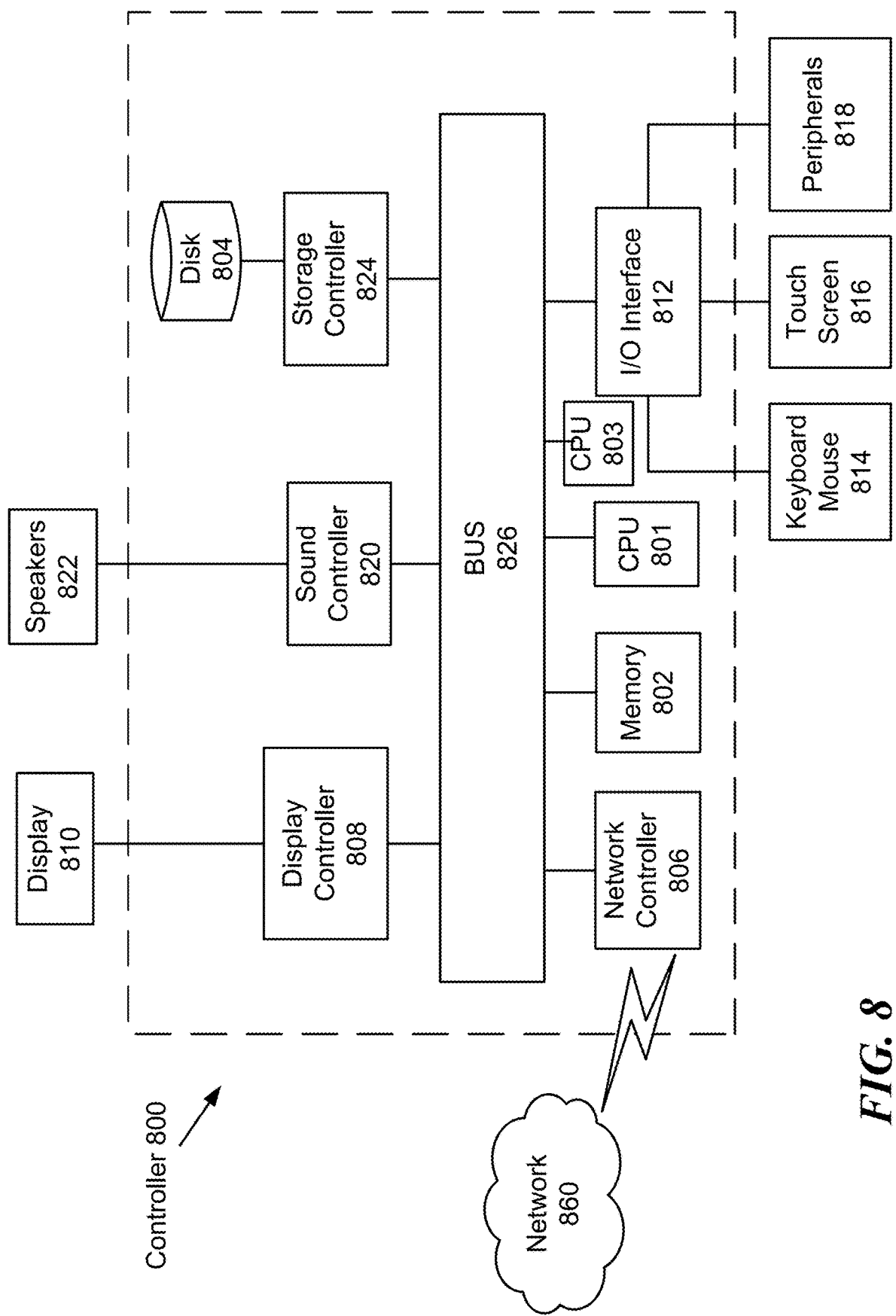
FIG. 8 is an illustration of a non-limiting example of details of computing hardware used in the computing system, according to certain embodiments.

Next, further details of the hardware description of the computing unit 702 of FIG. 7 according to exemplary embodiments are described with reference to FIG. 8. In FIG. 8, a controller 800 is described is representative of the computing unit 702 of FIG. 7 in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
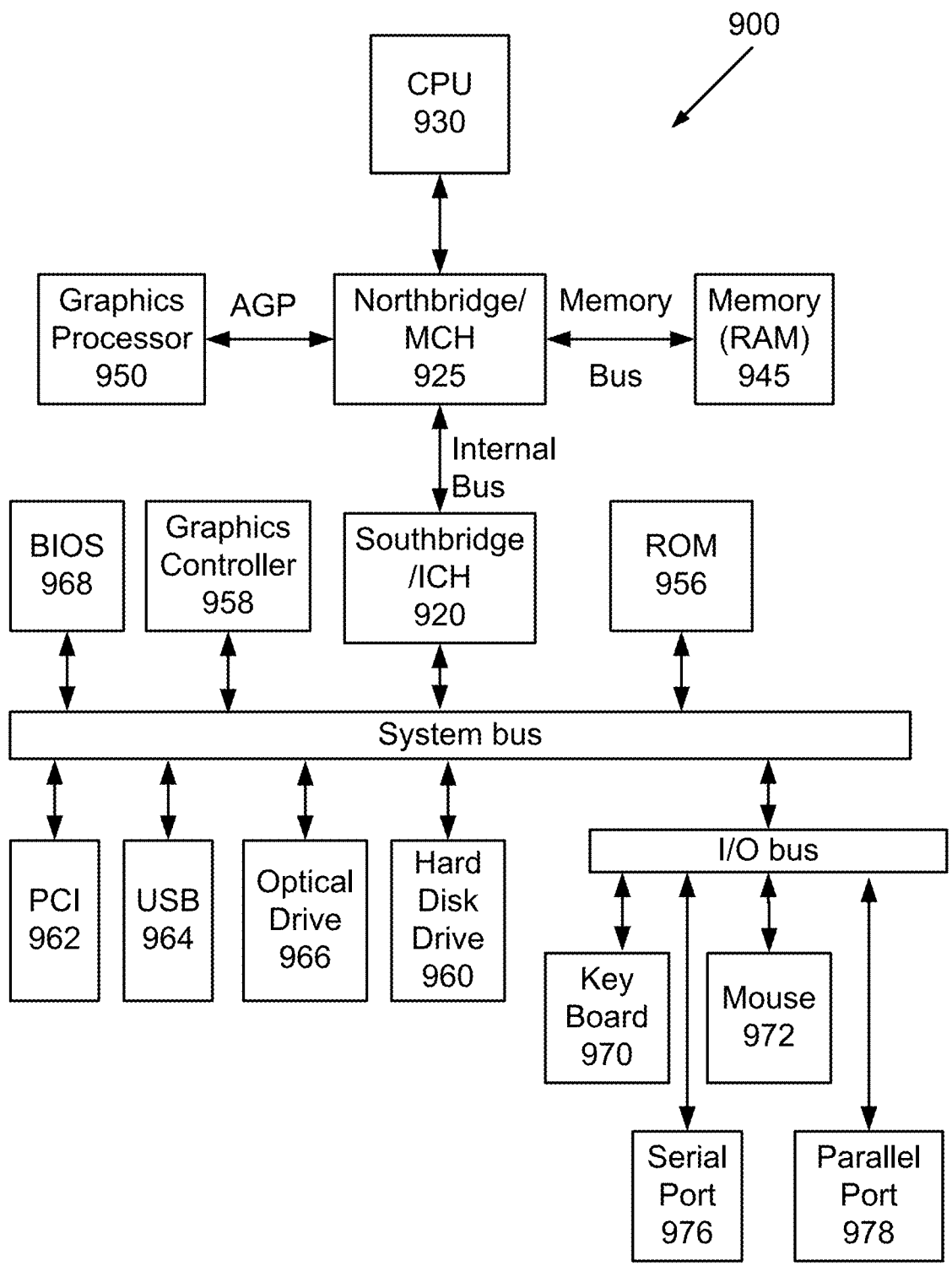
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
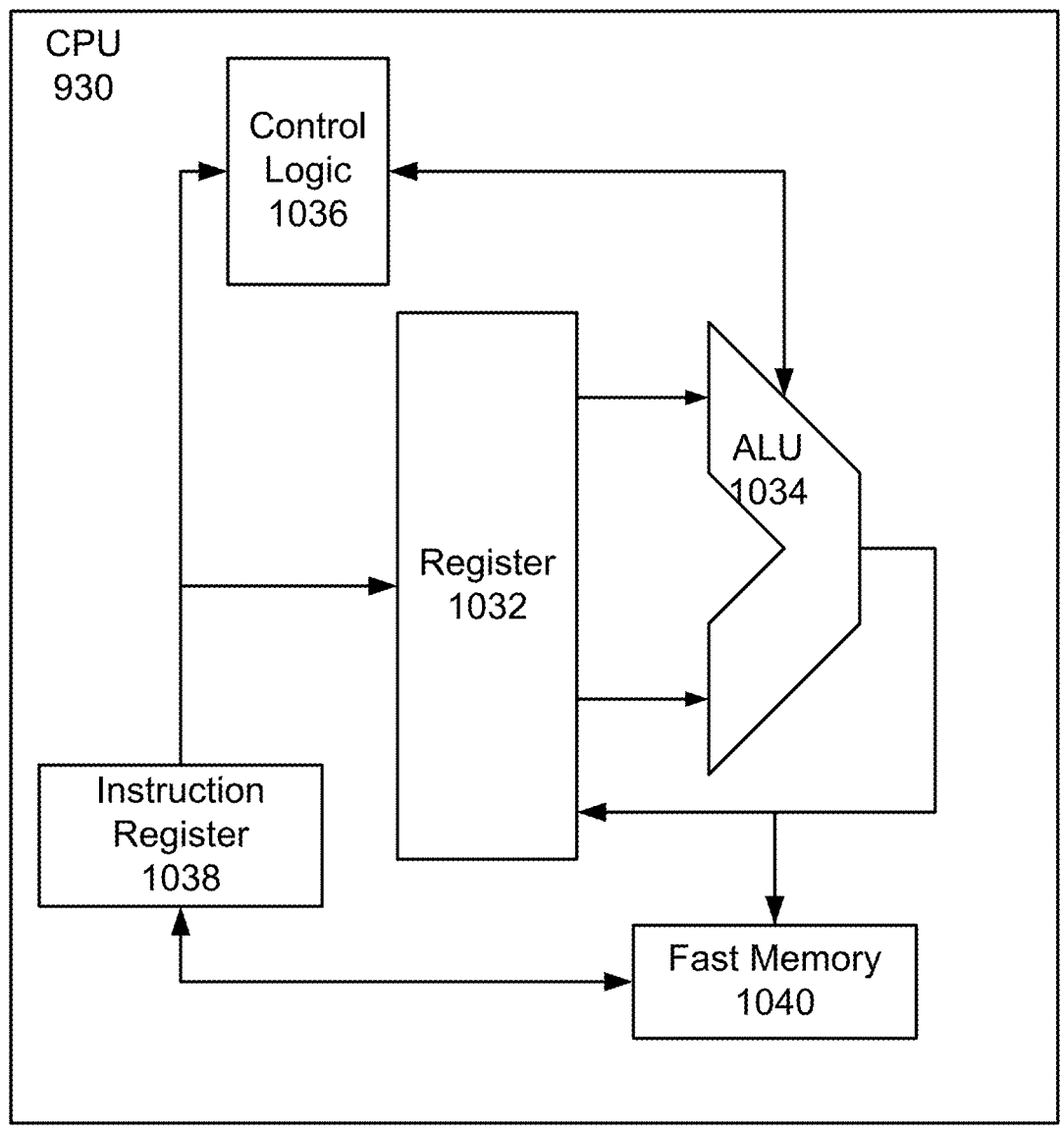
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 11:
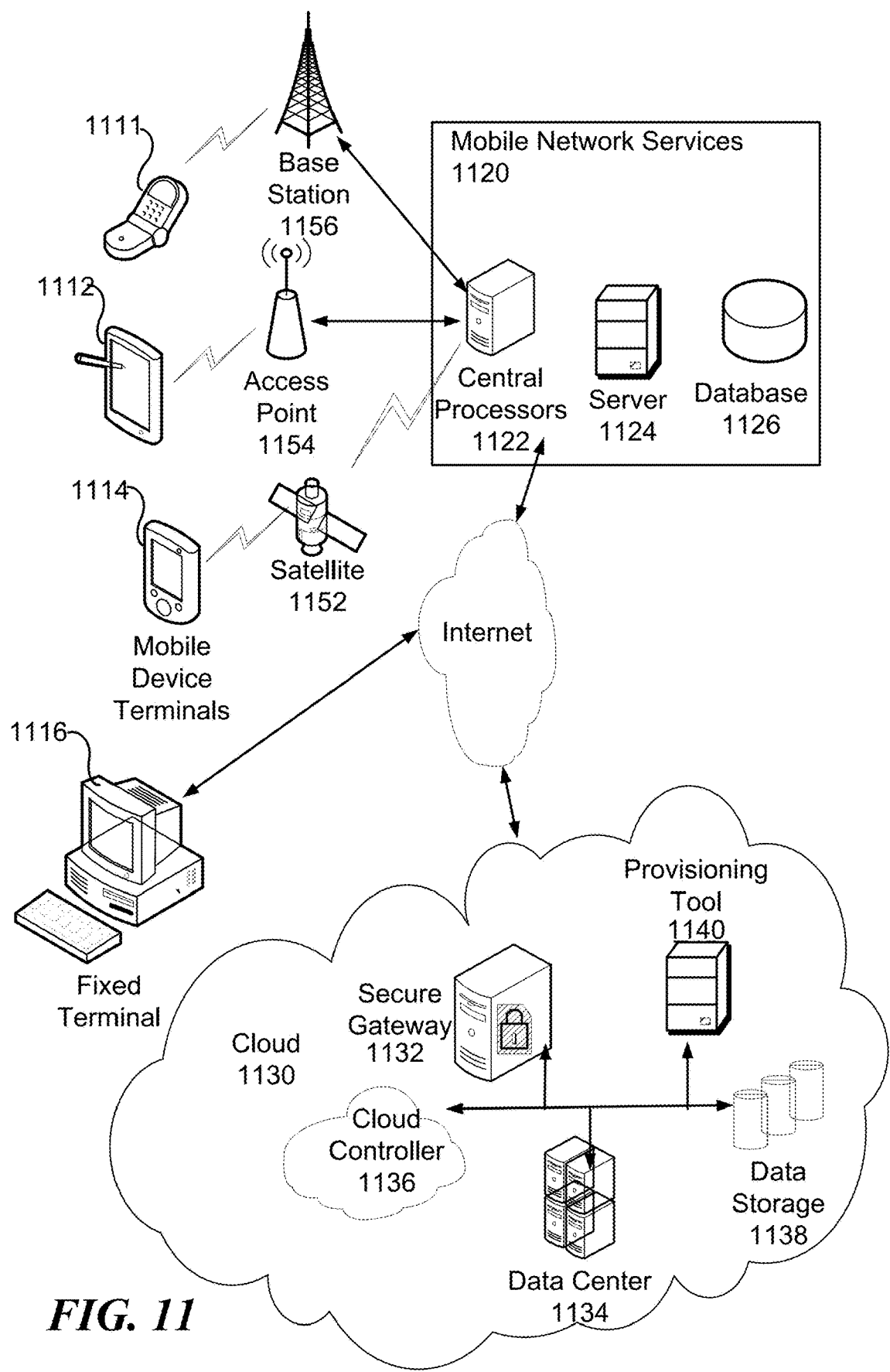
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An automated vehicle system for broadcasting a group mode status of automated vehicles travelling towards or within a roadway intersection, comprising:
a subject automated vehicle including:
a vehicle-to-vehicle communications unit configured to communicate with other automated vehicles within an area surrounding the subject automated vehicle and receive a mode status from each other automated vehicle, wherein the mode status reflects whether the other automated vehicle is operating in automated mode and or in non-automated mode;
at least one external vehicle sensor configured to generate data upon detecting vehicles or pedestrians within the defined area;
an external mode indicator configured to broadcast a visual signal;
a computing unit operatively connected to the vehicle-to-vehicle communications unit, the at least one external vehicle sensor and the external mode indicator, the computing unit including a non-transitory computer-readable medium having program instructions, executable by processing circuitry, to cause the processing circuitry to:
define the area by a radius which is centered on the subject automated vehicle;
determine whether there are any pedestrians near the roadway intersection;
when there are pedestrians near the roadway intersection, calculate the group mode status;
generate a visual signal representing the group mode status; and
actuate the external mode indicator to broadcast the visual signal;
wherein the processing circuitry is further configured to:
identify all automated and non-automated vehicles in the area from the data;
calculate a first total number of the automated and non-automated vehicles in the area, the first total number including the subject automated vehicle;
calculate a second number of automated vehicles operating in automated mode in the area from the mode statuses;
divide the second number by the first total number and multiply by 100 to calculate a percentage of automated vehicles operating in automated mode in the area; and
wherein the computing unit is further configured to broadcast the group mode status as the percentage on the external mode indicator.

2. The automated vehicle system of claim 1, wherein the computing unit is further configured to determine whether there non-automated vehicles near the roadway intersection and suppress the broadcast of the visual signal when there are no pedestrians or non-automated vehicles near the roadway intersection.

3. The automated vehicle system of claim 1, wherein the computing unit is further configured to actuate the external mode indicator to: broadcast the visual signal in a first color when the percentage is 100%; and broadcast the visual signal in a second color when the percentage is less than 100%.

4. The automated vehicle system of claim 3, wherein the processing circuitry is further configured to generate visual signal patterns to actuate the external mode indicator to:
flash the first color at a first frequency in a first intensity pattern when the percentage is 100%; flash the second color at a second frequency and in a second intensity pattern when the percentage is less than 100% and greater than or equal to 75%; flash the second color at the second frequency and in a third intensity pattern when the percentage is less than 75% and greater than or equal to 50%; flash the second color at the second frequency and in a fourth intensity pattern when the percentage is less than 50% and greater than or equal to 25%;
and flash the second color at the second frequency and in a fifth intensity pattern when the percentage is less than 25% and greater than or equal to zero.

5. The automated vehicle system of claim 1, wherein: the external mode indicator is a display screen located on the roof of the subject automated vehicle, wherein the display screen is configured to display at least one of text and numbers and the computing unit is configured to display the percentage as one of text and numbers; or the external mode indicator is a light bar located on the roof of the subject automated vehicle, wherein the light bar comprises a series of light segments and the computing unit is configured to display a magnitude of the percentage by lighting a related percentage of the light segments.

6. The automated vehicle system of claim 1, wherein the external mode indicator is an infrastructure sign located within the area defined by the radius, wherein the sign is configured to receive the group mode status from the subject automated vehicle and display the group mode status on the infrastructure sign.

7. The automated vehicle system of claim 1, wherein the processing circuitry is further configured to: identify all automated and non-automated vehicles in the area from the data; calculate the first total number of automated and non-automated vehicles in the area, the first total number including the subject automated vehicle; calculate the second number of automated vehicles operating in automated mode in the area from the mode statuses; subtract the second number from the first total number to generate a third number representing the number of non-automated vehicles and automated vehicles operating in non-automated mode within the area; and broadcast the group mode status on the external mode indicator as a ratio of the second number to the third number.

8. The automated vehicle system of claim 7, wherein the computing unit is further configured to:
broadcast the visual signal in a first color when the first total number is equal to the second number; and
broadcast the visual signal in a second color when the second number or third number is less than the first total number.

9. The automated vehicle system of claim 7, wherein:
the external mode indicator is a display screen located on the roof of the subject automated vehicle, wherein the display screen is configured to display at least one of text and numbers; and
the computing unit is configured to display the ratio as one of text and numbers.

10. The automated vehicle system of claim 1, wherein the computing unit is further configured to:
determine a speed of movement of the pedestrian when the pedestrian is crossing the roadway intersection;
assess the risk of the pedestrian in crossing the roadway intersection at the speed of movement in the presence of automated vehicles;
modify the intensity or pattern of the display of the group mode status based on the risk to increase the safety of the pedestrian when crossing the roadway intersection.

11. The automated vehicle system of claim 1, further comprising:
a vehicle-to-infrastructure communications unit operatively connected with the computing unit;
wherein the processing circuitry is configured to determine if a pedestrian is entering a crosswalk of the roadway intersection;
wherein the processing circuitry is configured to determine if the pedestrian is carrying a wireless communications device in communication with the vehicle-to-infrastructure communications unit; and
wherein the computing unit is configured to broadcast the group mode status to the wireless communications device.

12. A method for broadcasting a visual signal representing a group mode status of automated vehicles travelling towards or within a roadway intersection, comprising:
defining, with processing circuitry, an area around a subject automated vehicle by a radius which is centered on the subject automated vehicle;
detecting, with external sensors of the subject automated vehicle, any pedestrians and vehicles within the area;
determining, with the processing circuitry, a first total number of vehicles in the area;
receiving a mode status from each other automated vehicle in the area, wherein the mode status reflects whether the other automated vehicle is operating in automated mode or in non-automated mode;
determining, with the processing circuitry, whether there are any pedestrians or non-automated vehicles near the roadway intersection;
when there are pedestrians or non-automated vehicles near the roadway intersection:
calculating the group mode status;
generating a visual signal representing the group mode status;
actuating, with computing circuitry, an external mode indicator to broadcast the visual signal;
when there are no pedestrians or non-automated vehicles near the roadway intersection, suppressing the broadcast of the visual signal;
calculating the group mode status including:
identifying a second number of automated vehicles operating in automated mode in the area from the mode statuses;
dividing the second number by the first total number and multiplying by 100 to calculate a percentage of automated vehicles operating in automated mode in the area; and
broadcasting, on the external mode indicator, the group mode status as the percentage.

13. The method of claim 12, further comprising; generating, by the processing circuitry, visual signal patterns representing the percentage; actuating the external mode indicator to: flash the first color at a first frequency in a first intensity pattern when the percentage is 100%; flash the second color at a second frequency and in a second intensity pattern when the percentage is less than 100% and greater than or equal to 75%; flash the second color at the second at a third frequency and in a third intensity pattern when the percentage is less than 75% and greater than or equal to 50%; flash the second color at the second frequency and in a fourth intensity pattern when the percentage is less than 50% and greater than or equal to 25%;
and flash the second color at the second frequency and in a fifth intensity pattern when the percentage is less than 25% and greater than or equal to zero.

14. The method of claim 12, further comprising: calculating the second number of automated vehicles operating in automated mode in the area from the mode statuses; subtracting the second number from the first total number to generate a third number representing the number of non-automated vehicles and automated vehicles operating in non-automated mode within the area; and broadcasting the group mode status on the external mode indicator as a ratio of the second number to the third number.

15. The method of claim 14, further comprising:
determining, with the processing circuitry, whether a pedestrian is entering a crosswalk of the roadway intersection;
determining whether the pedestrian is carrying a smartphone or a smartwatch; and
broadcasting the group mode status to the smartphone or the smartwatch via vehicle-to-infrastructure communications.

16. A non-transitory computer readable medium having instructions stored therein that, when executed by one or more processors, cause the one or more processors to perform a method for broadcasting a visual signal representing a group mode status of automated vehicles travelling towards or within a roadway intersection, comprising:
defining, with processing circuitry, an area around a subject automated vehicle by a radius which is centered on the subject automated vehicle;
detecting, with external sensors of the subject automated vehicle, any pedestrians and vehicles within the area;
determining, with the processing circuitry, a first total number of vehicles in the area;
receiving a mode status from each other automated vehicle in the area, wherein the mode status reflects whether the other automated vehicle is operating in automated mode or in non-automated mode;
determining, with the processing circuitry, whether there are any pedestrians or non-automated vehicles near the roadway intersection;
when there are pedestrians or non-automated vehicles near the roadway intersection:
calculating the group mode status;
generating a visual signal representing the group mode status; and
actuating, with computing circuitry, an external mode indicator to broadcast the visual signal;
when there are no pedestrians or non-automated vehicles near the roadway intersection, suppressing the broadcast of the visual signal; and
calculating the group mode status by one of:
identifying a second number of automated vehicles operating in automated mode in the area from the mode statuses;
dividing the second number by the first total number and multiplying by 100 to calculate a percentage of automated vehicles operating in automated mode in the area;
subtracting the second number from the first total number to generate a third number representing the number of non-automated vehicles and automated vehicles operating in non-automated mode within the area;
generating a ratio of second number to the third number;
broadcasting, on the external mode indicator, the group mode status as one of the percentage and the ratio.

17. The non-transitory computer readable medium method of claim 16, further comprising:

determining, with the processing circuitry, whether a pedestrian is entering a crosswalk of the roadway intersection;

determining whether the pedestrian is carrying a smartphone or wearing a smartwatch; and broadcasting the group mode status to the smartphone or wearing a smartwatch via a vehicle-to-infrastructure communications.

* * * * *